US011065968B2

(12) United States Patent
Neuburger et al.

(10) Patent No.: US 11,065,968 B2
(45) Date of Patent: Jul. 20, 2021

(54) INTEGRATED MULTI-SOURCE IPT SYSTEM

(71) Applicant: Auckland UniServices Limited, Auckland (NZ)

(72) Inventors: Martin Neuburger, Göppingen (DE); Duleepa Jayanath Thrimawithana, Mt Wellington (NZ); Udaya Kumara Madawala, Stonefields (NZ); Baljit Singh Riar, Royal Oak (NZ); Steven Ian Ruddell, Grafton (NZ); Gaurav Rajesh Kalra, Mt. Roskill (NZ)

(73) Assignee: Auckland UniServices Limited, Auckland (NZ)

( * ) Notice: Subject to any disclaimer, the term of this patent is extended or adjusted under 35 U.S.C. 154(b) by 139 days.

(21) Appl. No.: 15/746,120

(22) PCT Filed: Jul. 20, 2016

(86) PCT No.: PCT/NZ2016/050116
§ 371 (c)(1),
(2) Date: Jan. 19, 2018

(87) PCT Pub. No.: WO2017/014648
PCT Pub. Date: Jan. 26, 2017

(65) Prior Publication Data
US 2018/0212471 A1 Jul. 26, 2018

(30) Foreign Application Priority Data
Jul. 20, 2015 (NZ) .......................... 709915

(51) Int. Cl.
*H01F 27/42* (2006.01)
*H01F 37/00* (2006.01)
(Continued)

(52) U.S. Cl.
CPC ............ *B60L 53/122* (2019.02); *H02J 7/025* (2013.01); *H02J 7/345* (2013.01); *H02J 50/10* (2016.02);
(Continued)

(58) Field of Classification Search
CPC .. H02J 50/12; H02J 50/10; H02J 7/025; H02J 5/005; B60L 53/122; H02M 7/219
See application file for complete search history.

(56) References Cited

U.S. PATENT DOCUMENTS

2006/0023478 A1* 2/2006 Takeda ..................... H02J 9/062
363/97
2011/0291479 A1* 12/2011 Lee ........................... H02J 3/32
307/43
(Continued)

FOREIGN PATENT DOCUMENTS

WO   WO-2014035260   3/2014
WO   WO-2017014648   1/2017

OTHER PUBLICATIONS

"International Application No. PCT/NZ2016/050116, International Search Report and Written Opinion dated Oct. 18, 2016", (dated Oct. 18, 2016), 17 pgs.

*Primary Examiner* — Rexford N Barnie
*Assistant Examiner* — Rasem Mourad
(74) *Attorney, Agent, or Firm* — Pilloff Passino & Cosenza LLP; Martin J. Cosenza

(57) ABSTRACT

An IPT primary or secondary circuit includes a converter connected to a primary energy source and a compensation network. A supplementary energy source is connected to the compensation network and the converter transfers energy between the primary energy source or another IPT primary or secondary circuit and the supplementary energy source.

20 Claims, 11 Drawing Sheets

(51) Int. Cl.
*H01F 38/00* (2006.01)
*B60L 53/122* (2019.01)
*H02J 7/02* (2016.01)
*H02J 50/10* (2016.01)
*H02J 7/34* (2006.01)
*H02J 50/12* (2016.01)
*H02M 7/219* (2006.01)

(52) U.S. Cl.
CPC ............. *H02J 50/12* (2016.02); *H02M 7/219* (2013.01); *B60L 2210/30* (2013.01); *Y02T 10/70* (2013.01); *Y02T 10/7072* (2013.01)

(56) References Cited

U.S. PATENT DOCUMENTS

| | | |
|---|---|---|
| 2013/0188397 A1 | 7/2013 | Wu et al. |
| 2013/0249479 A1 | 9/2013 | Partovi |
| 2014/0225432 A1* | 8/2014 | Geyer ................... H02M 1/10 |
| | | 307/10.1 |
| 2014/0232197 A1 | 8/2014 | Keeling et al. |
| 2015/0015197 A1* | 1/2015 | Mi ....................... B60L 11/182 |
| | | 320/108 |

* cited by examiner

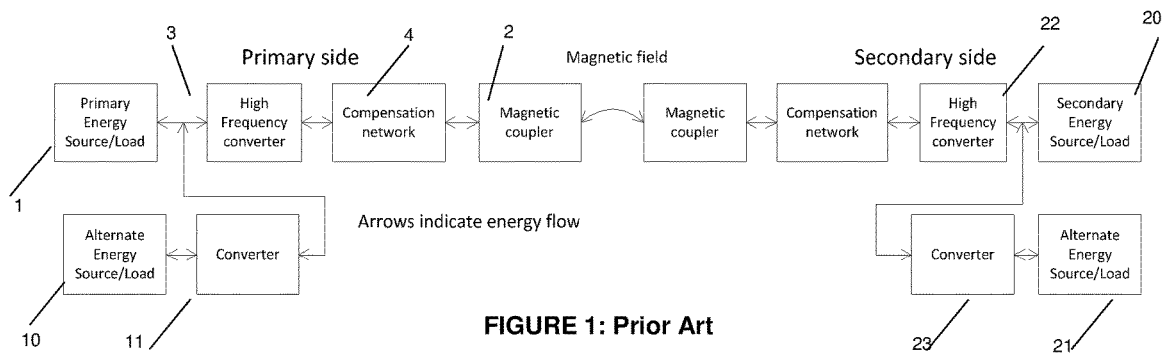
FIGURE 1: Prior Art
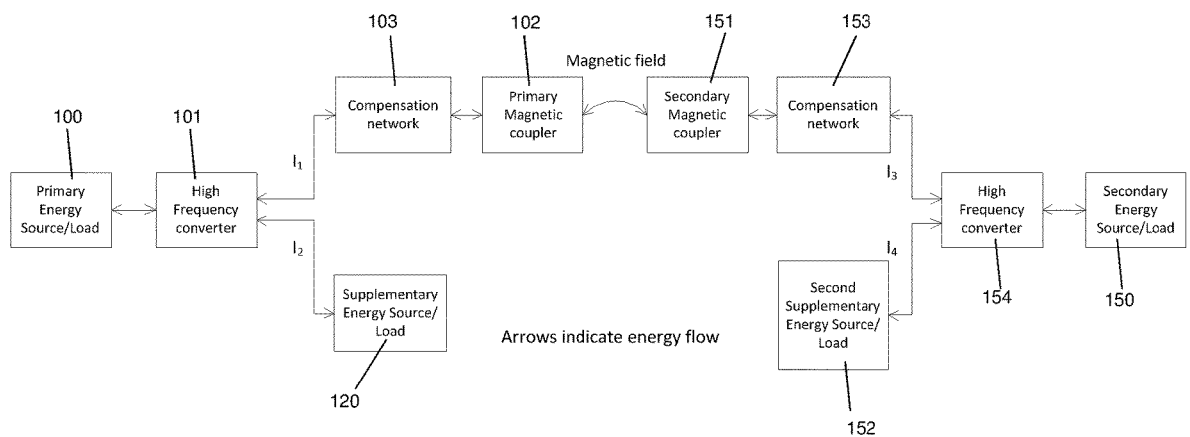
FIGURE 2

INTEGRATED MULTI-SOURCE IPT SYSTEM

PRIORITY CLAIM TO RELATED APPLICATIONS

This application is a U.S. national stage application filed under 35 U.S.C. § 371 from International Application Serial No. PCT/NZ2016/050116, which was filed 20 Jul. 2016, and published as WO2017/014648 on 26 Jan. 2017, and which claims priority to New Zealand Application No. 709915, filed 20 Jul. 2015, which applications and publication are incorporated by reference as if reproduced herein and made a part hereof in their entirety, and the benefit of priority of each of which is claimed herein.

FIELD OF THE INVENTION

This invention relates to a multi-source inductive power transfer (IPT) system. The multi-source IPT system of the present invention may be used for dynamic electric vehicle charging as well as stationary charging.

BACKGROUND

IPT systems are becoming increasingly popular as an efficient, reliable and acceptable technique for contactless or wireless charging of stationary electric vehicles (EVs). As a result, over the last decade, a number of new technologies that are suitable for stationary EV applications have been proposed and developed. Such solutions include new and improved magnetic couplers, various power converter topologies and novel control strategies to improve the reliability and efficiency of IPT systems. However, this trend is changing as dynamic EV charging using IPT technology is receiving attention because of the environmental, social and economic benefits it offers.

In contrast to IPT based charging of stationary EVs, charging moving electric vehicles can be considered as relatively more complex in terms of design and control. To cater for the power requirements while minimizing the complexity and cost of a dynamic IPT system, typically power is transmitted as short duration high energy pulses to the moving electric vehicles from discrete magnetic couplers that are placed at regular intervals along a road. As such, solutions proposed to date for dynamic EV applications usually incorporate an alternative storage element attached to the primary converter, often in form of a super-capacitor bank, to supply these short duration energy bursts. In addition, the wireless power receivers on the EV usually also employ a super-capacitor buffer to absorb these energy bursts thus avoiding pulse charging of the battery to conserve it's life.

Existing converter topologies for IPT applications, which include both stationary and dynamic EV charging, do not enable the integration of an alternative energy source, storage or load to supplement the primary energy source (storage or load) without the use of additional power electronics.

Unfortunately, traditional IPT systems require an additional dedicated power converter to integrate an alternative energy source (storage or load) with a primary energy source (storage or load). For example a traditional IPT system, which incorporates an alternative energy source 10 (storage or load), is shown diagrammatically in FIG. 1, where the primary energy source, storage or load 1 is coupled with the primary magnetic coupler 2 through a high-frequency power converter 3. The output of the power converter 3 attached to the primary energy source drives the primary magnetic coupler 2, which is compensated by the compensation network 4 to improve the VAR requirements, thus efficiently and wirelessly transferring power to a load 20 attached to the secondary side. In this typical case, the secondary side configuration is similar to that employed by the primary side. An alternative energy source, storage or load 10 is coupled with this system through a separate power converter 11. The converter 11 facilitates independent control of both energy sources, storage or loads to meet the functional requirements of the system. Such an arrangement, which requires an additional power converters 11 and 22 to provide individual control of both energy sources, storage or loads adds to the overall cost and complexity of the system while compromising system reliability due to high component count. Although solutions have been proposed to reduce the number of power converters required to integrate multiple energy sources, storage or loads, especially in the domain of traditional wired power converters, such methods invariably limit the controllability of the system and therefore compromise the effectiveness and utilization of the alternative energy sources.

OBJECT OF THE INVENTION

It is an object of the invention to provide a dynamic electric vehicle charging system which overcomes or at least ameliorates one or more disadvantages of the prior art, or alternatively to at least provide the public with a useful choice.

Further objects of the invention will become apparent from the following description.

SUMMARY OF INVENTION

In a first aspect the invention may broadly be said to consist in an IPT primary or secondary circuit comprising:
 a converter associated with a primary source and a compensation network;
 a supplementary source connected to the compensation network;
 wherein the converter is operable to transfer energy between the primary source or another IPT primary or secondary circuit and the supplementary source.

Preferably the converter is also operable to energise the compensation network, or rectify current induced in the compensation network, to facilitate transfer energy to or from the other of an IPT secondary or primary circuit.

In another aspect the invention may broadly be said to consist in an IPT primary circuit comprising:
 a converter associated with a primary source and a compensation network;
 a supplementary source connected to the compensation network;
 wherein the converter is operable to transfer energy between the primary source and supplementary source.

Preferably the converter is also operable to energise the compensation network to facilitate transfer energy to or from an IPT secondary circuit.

In another aspect the invention may broadly be said to consist in an IPT secondary circuit comprising:
 a converter associated with an output source and a compensation network;
 a supplementary source connected to the compensation network;
 wherein the converter is operable to transfer energy between the output source and supplementary source.

Preferably the converter is also operable to rectify current induced in the compensation network, to facilitate transfer energy to or from an IPT primary circuit.

In another aspect the invention may broadly be said to consist in an IPT system comprising a primary circuit and a secondary circuit, the secondary circuit comprising:

a converter associated with an output source and a compensation network;

a supplementary source connected to the compensation network;

wherein the converter is operable to transfer energy between the output source and supplementary source.

Preferably the converter is also operable to rectify current induced in the compensation network, to facilitate transfer energy to or from an IPT primary circuit.

In another aspect the invention may broadly be said to consist in an IPT system comprising a secondary circuit, and a primary circuit comprising:

a converter associated with a primary source and a compensation network;

a supplementary source connected to the compensation network;

wherein the converter is operable to transfer energy between the primary source and supplementary source.

Preferably the converter is also operable to energise the compensation network to facilitate transfer of energy to or from an IPT secondary circuit.

In another aspect the invention may broadly be said to consist in an IPT system comprising a primary and a secondary circuit in accordance with any one of the preceding statements.

In one embodiment the converter controls power transfer between the primary source or the outlet source and the supplementary source by controlling switches of one or more converters.

In one embodiment the sources sink or supply direct current. The switches of the converter may be controlled by a controller or a control means to transfer energy to from the supplementary source by transferring direct current to or from the supplementary source.

In one embodiment the switches are controlled to transfer direct current to or from the supplementary source and simultaneously supply alternating current to a compensation network for inductive power transfer.

In one embodiment the switches are controlled to transfer direct current to or from the supplementary source and simultaneously rectify alternating current from a compensation network for inductive power transfer.

In another aspect the invention may broadly be said to consist in a method of controlling energy flow in a primary or secondary circuit of an IPT system, the method comprising switching an alternating current to transfer power inductively, and switching a direct current to or from a supplementary supply connected to a compensation network of the primary or secondary.

In one embodiment the method comprises switching the direct current to or from a primary source or an outlet source.

In one embodiment the method comprises using a converter to control the power transfer.

In one embodiment the converter controls power transfer between the primary source or the outlet source and the supplementary source by controlling switches of one or more converters.

In one embodiment the sources sink or supply direct current. The switches of the converter may be controlled by a controller or a control means to transfer energy to from the supplementary source by transferring direct current to or from the supplementary source.

In one embodiment the switches are controlled to transfer direct current to or from the supplementary source and simultaneously supply alternating current to a compensation network for inductive power transfer.

In one embodiment the switches are controlled to transfer direct current to or from the supplementary source and simultaneously rectify alternating current from a compensation network for inductive power transfer.

In another aspect the invention may broadly be said to consist in a dynamic electric vehicle charging system comprising an IPT primary circuit or an IPT secondary circuit according to any one of the preceding statements.

In another aspect the invention may broadly be said to consist in a method of dynamic electric vehicle charging comprising controlling energy flow in a primary or secondary circuit of an IPT system by:

switching an alternating current to transfer power inductively, and;

switching a direct current to or from a supplementary supply connected to a compensation network of the primary or secondary circuit.

In a further aspect the invention may be said to consist in a dynamic electric vehicle charging system using or adapted to be used for any one or more of the methods described herein.

Further aspects of the invention, which should be considered in all its novel aspects, will become apparent from the following description.

DRAWING DESCRIPTION

A number of embodiments of the invention will now be described by way of example with reference to the following drawings.

FIG. 1 is a traditional IPT system employing two energy sources, where the arrows indicate energy flow.

FIG. 2 is a first example of an IPT system of the present invention employing two energy sources, where the arrows indicate energy flow.

DETAILED DESCRIPTION OF THE DRAWINGS

Figure 3:
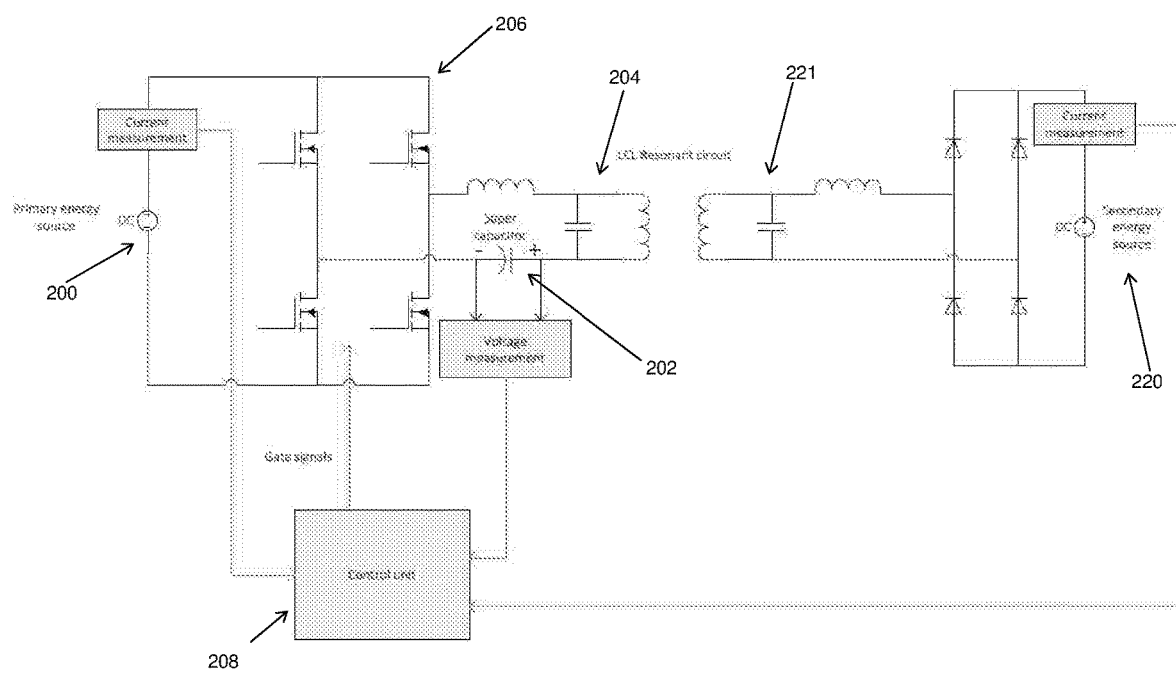
FIG. 3 is a first example of an LCL tuned IPT system of the present invention employing a source and storage.

The IPT system of the present invention, suitable for use with dynamic electric vehicle charging as well as stationary charging, is shown in FIG. 2. The system of the present invention enables the integration of alternative energy or voltage sources, storage or loads (hereinafter referred to as "source" or "sources") with a primary energy source through a single power converter. In the case of a bi-directional IPT circuit (i.e. a primary circuit that may operate as a secondary circuit and vice versa), the primary source may both supply and receive energy.

The present system facilitates bi-directional power transfer between the two energy sources 100, 120 as well as uni- or bi-directional power transfer with the secondary of an IPT system and each source. The individual control of the two sources and the secondary load 150 is achieved by modulating the output of the high frequency power converter 101 to produce an AC and a DC component. The magnitude of the AC and the DC components produced can be controlled independently by varying the duty cycles and relative phases of the switching elements employed by the power converter 101. More sources can be accommodated by incorporating multiple AC frequencies.

As an example, the DC component of the output generated by the power converter, labelled $I_2$, can be utilized to regulate the energy flow into and out of the supplementary energy source 120, which may include, but is not limited to, solar cells, fuel cells, chemical cells, super capacitors or a passive load. The AC component of the output generated by the power converter 101, labelled I1, is utilized to energize the primary magnetic coupler 102 through the compensation network. The compensation network 103 is designed to compensate for the reactive impedance presented by the primary coupler at the AC frequency generated by the power converter, while allowing the DC component to flow between the primary and supplementary energy sources. The compensation network may comprise a tuned circuit or resonant circuit.

The time varying magnetic field produced by the primary magnetic coupler 102 induces a voltage on the secondary magnetic coupler 151, which is magnetically coupled with the primary magnetic coupler 102 to receive energy wirelessly from the two sources 100, 120 attached to the primary converter. The secondary may consist of a mirror image of the primary side or can compose of a traditional uni- or bi-directional pick-up converter. In FIG. 2, a mirror image of the primary is utilised, and in this example it is possible to transfer bi-directional power between four energy sources, two primary sources 100, 120 and two secondary sources 150, 152. Also this concept can be expanded to cater for more than four sources if a multi-phase IPT system is utilized. As such, the proposed technology enables efficient integration of multiple energy sources with an IPT system through a significantly reduced number of power conversion stages. The system of the present invention is therefore expected to be a vital component of future dynamic IPT systems to provide efficient integration of hybrid energy sources, which will be essential to improve the reliability and power transfer capability of such systems.

There are a number of possible implementations of the multi-source IPT system of the present invention. The following section describes three possible implementations, together with supporting simulations results. It is important to note that the IPT systems of the present invention can be applied to a number of other existing IPT converter topologies as well as traditional power converters. Although the system of the present invention is capable of facilitating bi-directional energy flow between the sources, for simplicity the examples below simply describe one-directional flow. As previously discussed, the passive rectifier circuits utilised in the pick-up circuits of the examples below can be replaced with an active rectifier, for example a full-bridge (or multi-phase) converter, to enable bi-directional power transfer as well as integration of additional energy sources into the pick-up circuit.

Example 1

FIG. 3 shows a first example IPT system, which employs LCL type compensation networks, used to validate the system of the present invention. In this case power can be transferred from the primary energy source 200 to the secondary load, where the secondary load 220 is depicted as an active load by a voltage source. A super-capacitor 202 connected in series with the LCL network 204 is used as the supplementary energy source in this example. A voltage sourced full-bridge converter 206 is employed in this example to generate the required AC and DC voltages to drive the primary magnetic coupler and to regulate the energy flow between the primary source and the super-capacitor. When the primary source is providing extra power than what is transferred to a secondary load 220, the excess energy is stored in the super-capacitor, which will result in an increase of voltage across the super-capacitor. When the load 220 is demanding more power than the source is supplying, for example an energy burst in the case of a dynamic IPT system, the super capacitor 202 provides energy to the load. The transfer of energy in or out of the super capacitor is controlled by the DC output of the primary converter 206, whereas the transfer of energy to the secondary is controlled by the AC output of the primary inverter 206.

A control unit 208 monitors the voltage across the super capacitor 202, the current flowing to/from the primary energy source 200, and the current flowing into the secondary. The control unit 208 then varies the duty cycle of the upper switches of each half bridge compared to the lower switches to vary the DC output of the primary full-bridge converter 206. Although this DC output causes a DC current to flow through the LCL network 204 and the primary coupler, it does not induce a voltage on the pick-up magnetic coupler 221 and therefore the power transfer to the pick-up is unaffected. The direction of this DC current is determined by the difference between the DC voltage produced by the converter 206 and the super-capacitor voltage. Depending on the direction of the DC current flow, the super-capacitor 202 will charge or discharge and the rate of charge or discharge is determined by the rate of change of the converter DC output voltage. This allows the system to control the flow of energy in and out of the super capacitor using the full-bridge converter 206 independently of the power transferred to the load. The average duty cycle of all four switches can be varied by the controller to vary the AC output of the converter. The AC component of the converter output does not contribute towards energy transferred to the super-capacitor, but will directly control the flow of energy through to the secondary load. As such, the DC and AC outputs of the converter can be varied independently and simultaneously to allow a single converter to direct energy between all three elements of this example system.

Figure 4:
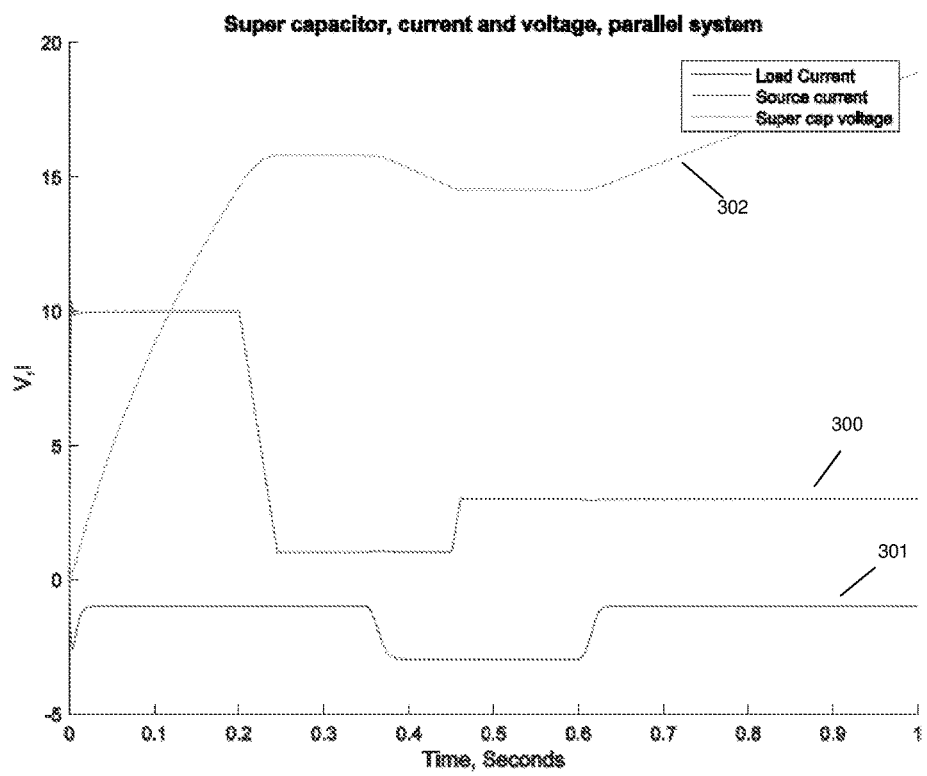
FIG. 4 are simulated operations of the LCL tuned IPT system of FIG. 3.

FIG. 4 shows simulated results obtained from a 3.7 kW IPT system, which is based on the circuit topology shown in FIG. 3. The primary source current 300 is initially driven to 10A. The positive value of the current indicates that the primary energy source is providing energy to the system. The load current 301 at −1 A indicates that the load is receiving some of the energy, while the remainder is transferred to the super capacitor 302. This can be seen as the voltage across the super capacitor increasing. At 0.25 seconds, the source current and the load current are balanced, resulting in no change in voltage of the super capacitor. At 0.35 seconds the load current increases, drawing energy from the capacitor. In this condition, the duty cycle of the lower switches of each half bridge have been increased by the controller to apply a negative rate of change of DC voltage across the super capacitor to achieve the desired system response.

Example 2

Figure 5:
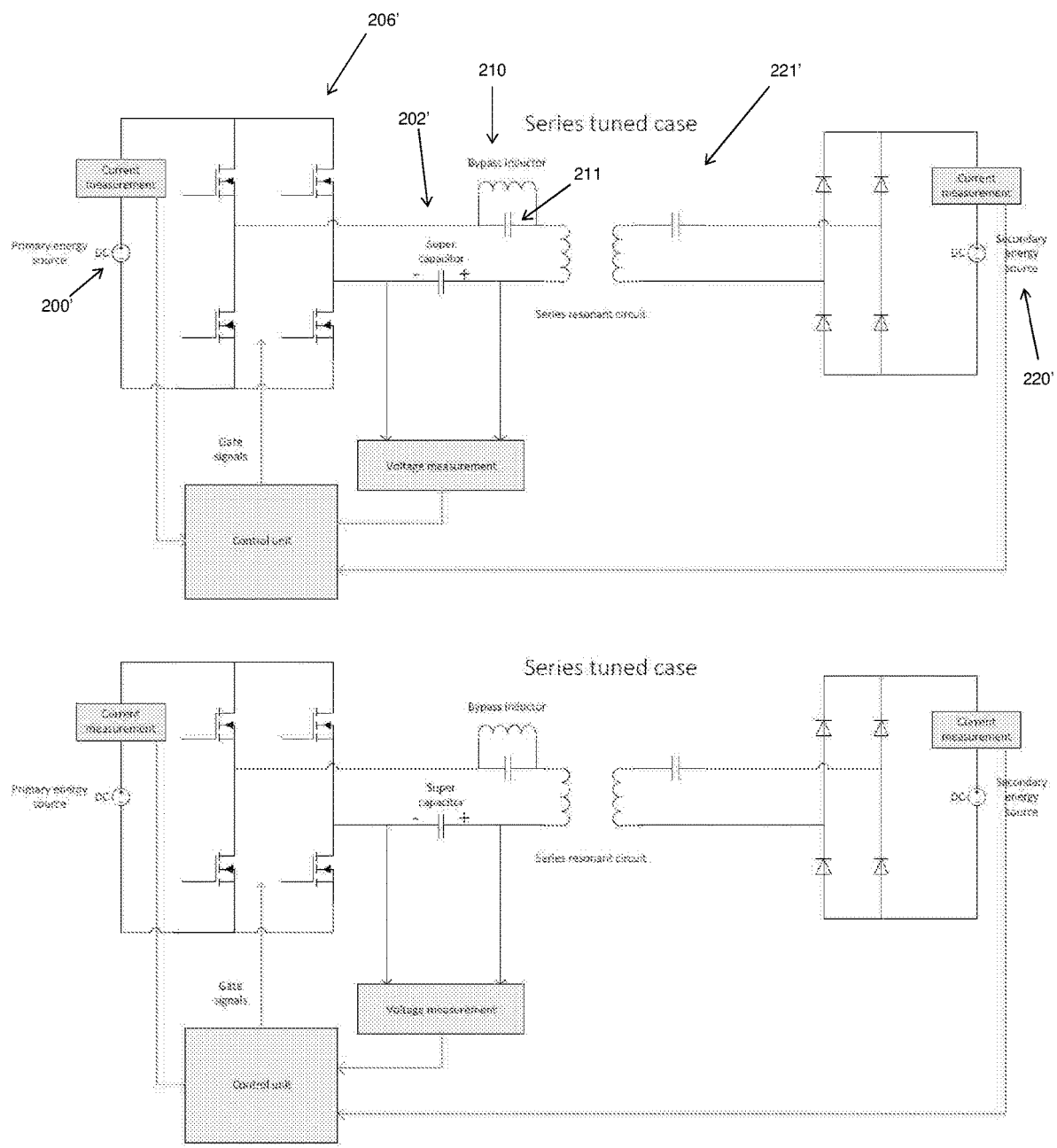
FIG. 5 is a second example of a series tuned IPT system of the present invention employing a source and storage.

FIG. 5 shows second example of the IPT system of the present invention in the form of a series tuned IPT system. The overall operation of the circuit is similar to that shown above in 'Example 1' with the exception of a bypass inductor 210. This added component allows the DC output of the converter 206' to bypass the series tuning capacitor 211 without affecting the compensation (resonant) network, which may be a tuned circuit. The bypass inductor 210 is selected to have a high impedance at the AC frequency of the converter so as not to interfere with the power transferred to the secondary.

Figure 6:
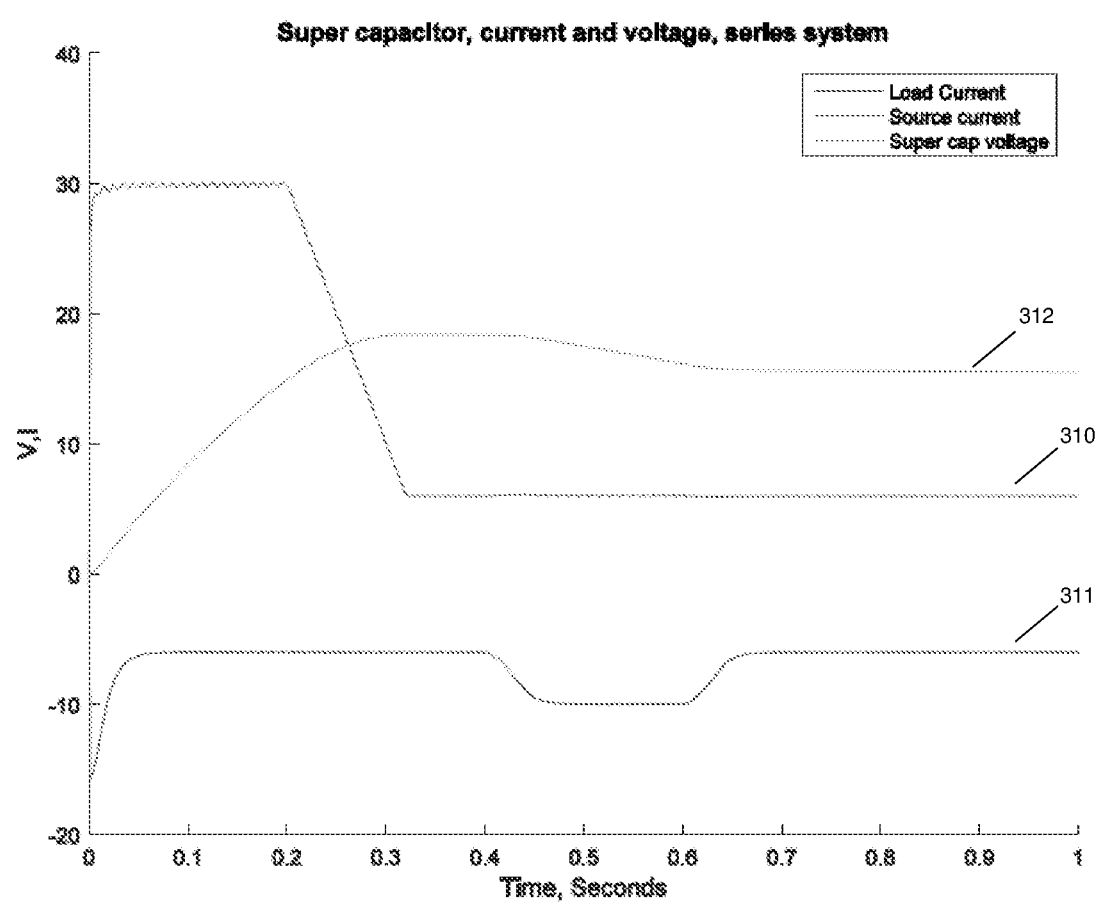
FIG. 6 shows simulated operations of the series tuned IPT system of FIG. 5.

FIG. 6 shows the operating currents for the source 310 and load 311 along with the voltage across the super-capacitor 312. In this example, the primary source initially provides more energy than is being delivered to the load. The excess energy is stored in the super-capacitor. At 0.4 seconds the load demand increases, while the source provides a constant power output; the super capacitor voltage decreases as it supplies energy to the system to make up the deficit.

Example 3

Figure 7:
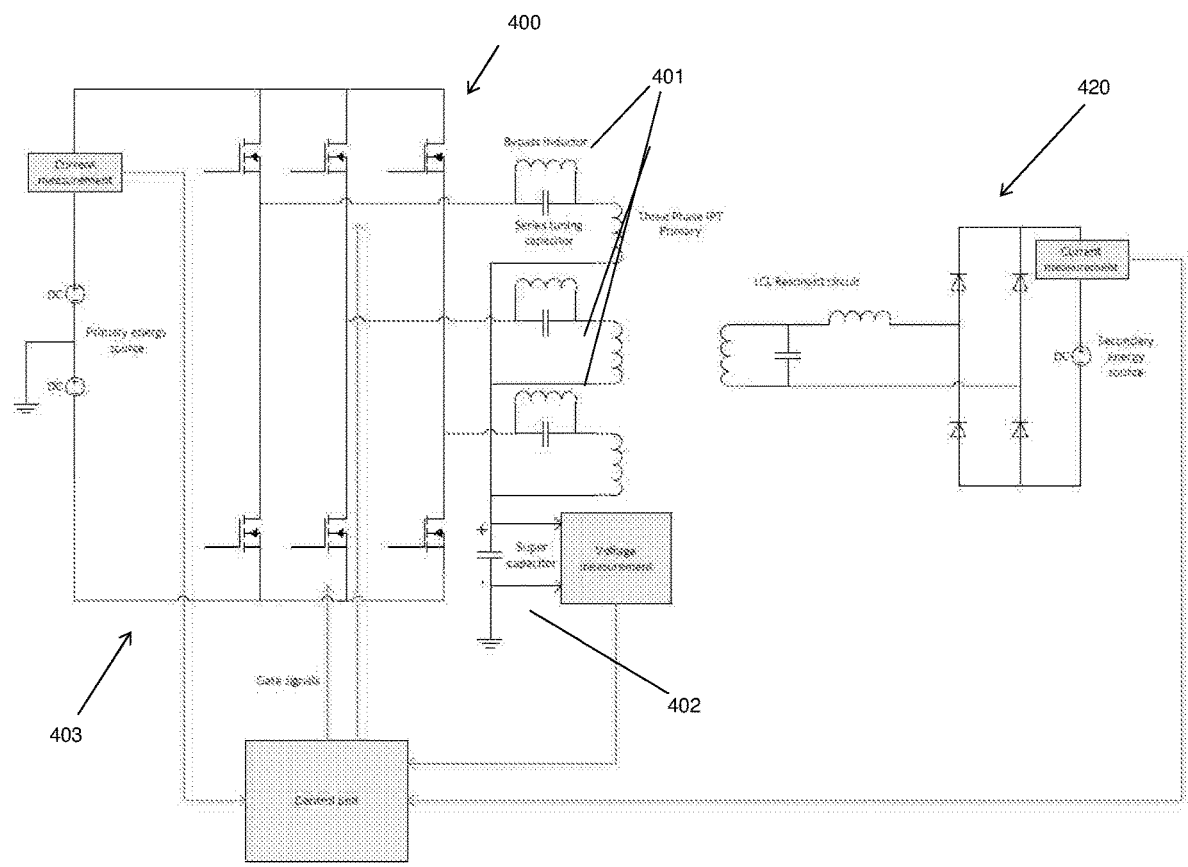
FIG. 7 is a third example of a three-phase IPT system of the present invention employing a source and storage.

FIG. 7 shows a third example of an IPT system of the present invention applied to a three-phase IPT system 400 coupled with a single phase secondary 420. Each arm of the three-phase primary circuit is series tuned and features a bypass inductor 401 as described above in Example 2. The super-capacitor 402 may be connected between the neutral point of the primary circuit and ground. Alternatively, three separate alternative sources, for example super-capacitors, could be used by inserting them in series with each arm.

In the configuration shown in FIG. 7, the DC input voltage is split above and below ground potential. Therefore, by varying the duty cycle of the switches in the primary converter 403 is possible to simultaneously vary the DC and AC output of each leg of the converter. The DC imbalance at of the three legs sum at the neutral point and is fed into the super capacitor 402. By feeding current into the neutral point the capacitor can be charged, or alternatively by drawing current from the neutral point it is possible to discharge the super capacitor 402.

Figure 8:
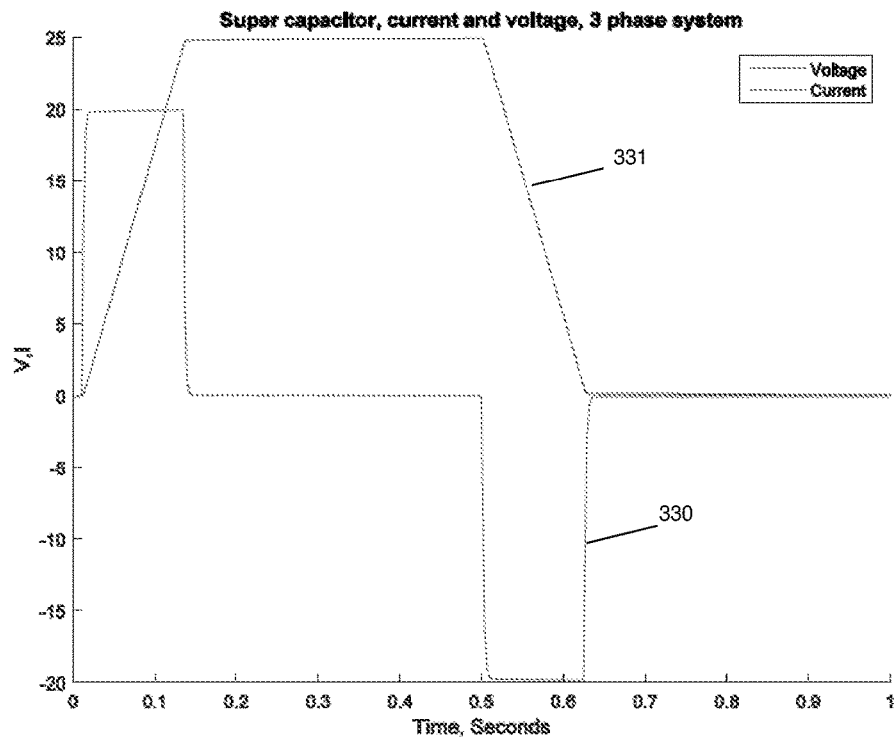
FIG. 8 shows simulated operations of the three-phase tuned IPT system of FIG. 7.

FIG. 8 shows the current imbalance at the neutral point of the primary circuit 330 along with the voltage across the super capacitor 331. The simulation shows that energy can be stored in the super capacitor, held there for a period of time, and then returned to the secondary side of the circuit. It is significant to note that the power transferred to the secondary can be controlled simultaneously and independently to the super capacitor.

Modes of operation of the converters which can be used to implement the various energy transfers referred to above will now be described below with reference to FIGS. 9-15.

The following assumptions are made in this description of the proposed topology: the super capacitor SC is operated at a lower voltage than the secondary voltage source at all times and must not be negatively charged; both the input and output voltage sources are capable of sinking and sourcing as much current as the system demands or supplies.

Figure 9:
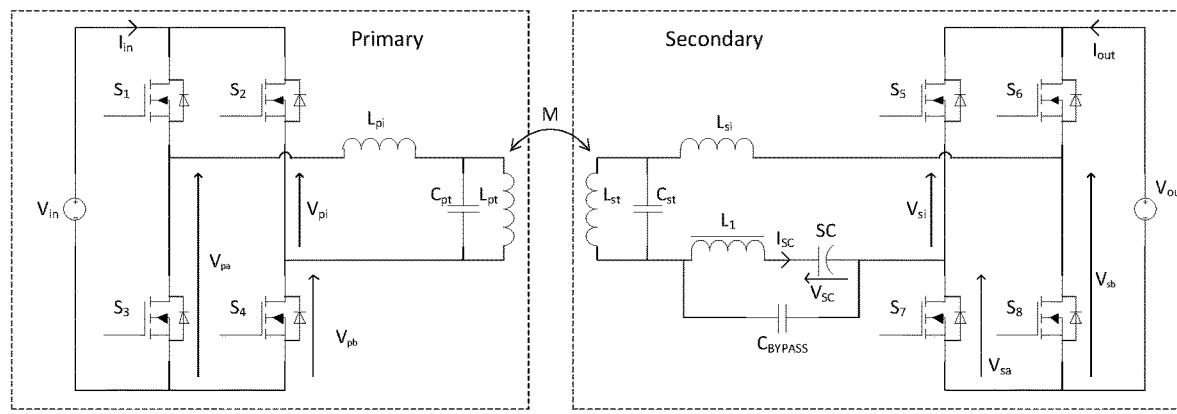
FIG. 9 shows another example of an IPT system of the invention which includes a supplementary source in the secondary side of the system.

FIG. 9 shows the overall topology of the system, the input and output voltage sources are represented by $V_{in}$ and $V_{out}$ respectively. Switches $S_1$ through to $S_4$ are driven by the primary side controller, whereas switches $S_5$ through to $S_8$ are driven by the secondary side controller. Note that in the system used in this example, the SC is provided on the secondary side. The SC has an inductor $L_1$ provided in series to facilitate energy transfer to or from the SC using buck or boost type switching methodologies as will be described further below. Furthermore, a capacitor $C_{BYPASS}$ is connected in parallel across SC and $L_1$ to allow AC components to bypass SC.

Table 1 shows the direction of power transfer of $V_{in}$, $V_{out}$, and SC for each mode of operation, where + indicates providing power, − indicates receiving power and 0 indicates no transfer.

TABLE 1

| | Operating Modes | | |
|---|---|---|---|
| Mode | Power from vin | Power from Vout | Power from SC |
| 1 | 0 | + | − |
| 2 | 0 | − | + |
| 3 | + | − | 0 |
| 4 | − | + | 0 |
| 5 | + | − | − |
| 6 | + | − | + |
| 7 | + | + | − |
| 8 | − | − | + |
| 9 | − | + | − |
| 10 | − | + | + |

The following section describes the modes of operation of the system in detail. It should be noted that modes 1 through to 4 are the basic operations of the system whereas modes 5 though to 10 are simultaneous combinations of one of modes 1 or 2 with one of modes 3 or 4. Consequently, more detail is provided for modes 1 to 4.

Figure 10:
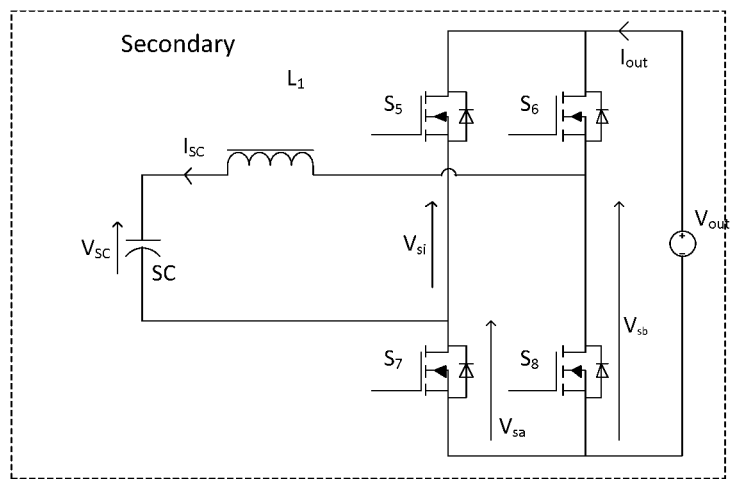
FIG. 10 shows an equivalent circuit for the secondary of FIG. 9.
Figure 11:
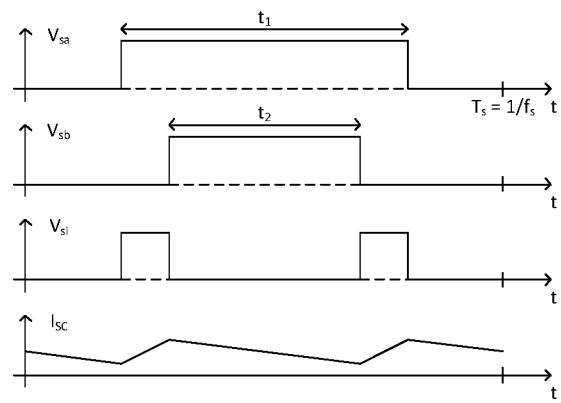
FIG. 11 shows voltage and current waveforms for the converter in the secondary of FIG. 9 in a first mode of operation.

Mode 1—In this mode of operation energy is transferred from the secondary voltage source Vout to the super capacitor. Mode 1 is the reverse operation of mode 2, which will be described below. The secondary full-bridge switches are operated as a buck converter. As shown in FIG. 10, in this mode the resonant tank can be simplified to an equivalent inductor, which acts as the inductor of the buck converter. The primary bridge is inactive for this mode of operation and is not necessarily present. If the average voltage generated by the full-bridge converter, Vsi, is larger than Vsc then the SC is charged using Vout. The voltage and current waveforms under this mode of operation is shown in FIG. 11. As the SC charges, $V_{SC}$ increases and the controller will respond by decreasing the buck converter gain to maintain a controlled SC charging current $I_{SC}$.

Figure 12:
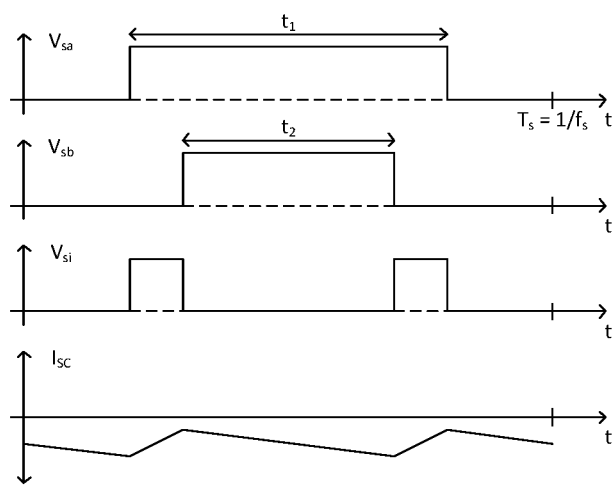
FIG. 12 shows voltage and current waveforms for the converter in the secondary of FIG. 9 in a second mode of operation.

Mode—2 Mode 2 is the reverse operation of mode 1. As shown in FIG. 12, the full-bridge is driven in an identical manner, but to produce an average voltage lower than $V_{sc}$. In this mode of operation, therefore, the secondary bridge switches are operated as a boost converter and energy is transferred from the SC to the secondary voltage source, $V_{out}$. As the SC discharges, $V_{SC}$ decreases and the controller will respond by increasing the boost converter gain to maintain constant a constant output voltage.

Figure 13:
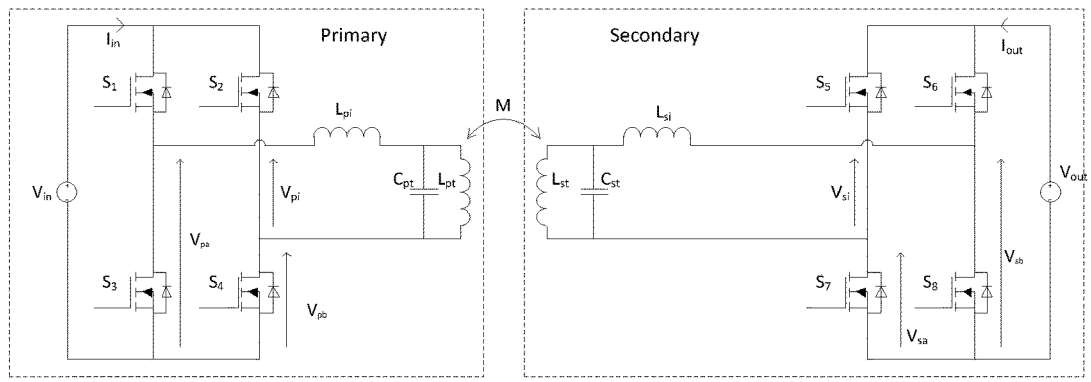
FIG. 13 shows an equivalent circuit for FIG. 9 when power is being transferred from the primary to the secondary or vice versa in accordance with power transfer in a conventional bi-directional IPT system.
Figure 14:
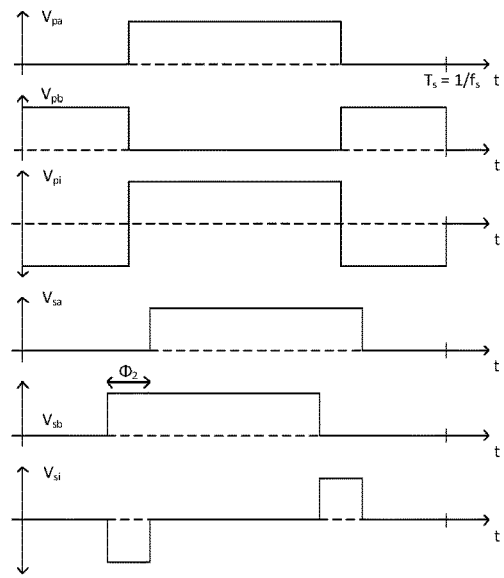
FIG. 14 shows voltage and current waveforms for the converters in the primary and secondary of FIG. 9 in a third mode of operation.

Mode 3—As shown in FIG. 13, the system is operated as a traditional bi-directional IPT system and therefore, in this mode of operation energy is only transferred from the input voltage source to the output voltage source. The SC does not provide nor receive energy in this mode. As shown in FIG. 14, the primary bridge switches $S_1$ through to $S_4$ are operated to provide an AC current to the primary IPT pad $L_{pt}$ through the primary coupling circuit $C_{pt}$ and $L_{pi}$. The primary IPT pad current is coupled to the secondary IPT pad $L_{st}$ through the mutual inductance M. The secondary IPT pad current is coupled to the secondary bridge through the compensation network formed by $L_{st}$ and $C_{st}$. The switches in the secondary bridge are operated as a synchronous rectifier to rectify the current from the secondary compensation network, to deliver DC current to $V_{out}$.

Figure 15:
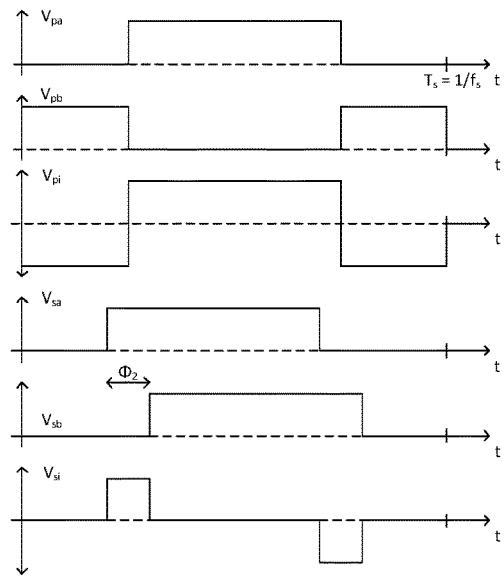
FIG. 15 shows voltage and current waveforms for the converters in the primary and secondary of FIG. 9 in a fourth mode of operation.

Mode 4—Mode 4 is the reverse operation of mode 3 and the bi-directional IPT system in FIG. 13 is transferring power in the reverse direction. Therefore, in this mode of operation energy is transferred from the output voltage source to the input voltage source and the SC does not provide nor receive energy. The secondary bridge switches $S_5$ through to $S_8$ are operated to provide an AC current to the secondary IPT pad $L_{st}$ through the secondary coupling circuit $C_{st}$ and $L_{si}$. The secondary IPT pad current is coupled to the primary IPT pad $L_{pt}$ through the mutual inductance M. The primary IPT pad current is coupled to the primary bridge through the compensation network formed by $C_{pt}$ and $L_{pi}$. The switches in the primary bridge are operated as a synchronous rectifier to rectify the current from the primary compensation network, to deliver DC current to the input voltage source. As shown in FIG. 15, the voltage waveforms for this mode are similar the waveforms shown in FIG. 14 but $V_{pi}$ now lags behind $V_{si}$.

Mode 5—In this mode of operation energy is transferred from the input voltage source to the output voltage source and the SC. Mode 5 is a simultaneous combination of modes 1 and 3 with mode 3 operating at a higher power setting than mode 1.

Mode 6—In this mode of operation energy is transferred from the input voltage source and the SC to the output voltage source. Mode 6 is a combination of modes 2 and 3

Mode 7—In this mode of operation energy is transferred from the input voltage source and the output voltage source to the SC. Mode 7 is a combination of modes 1 and 3 with mode 1 operating at a higher power level than mode 3.

Mode 8—In this mode of operation energy is transferred from the SC to the input voltage source and the output voltage source. Mode 8 is a combination of modes 2 and 4, with mode 2 operating at a higher power setting than mode 4.

Mode 9—In this mode of operation energy is transferred from the output voltage source to the input voltage source and SC. Mode 9 is a combination of modes 4 and 1.

Mode 10—In this mode of operation energy is transferred from the output voltage source and SC to the input voltage source. Mode 10 is a combination of modes 4 and 2, with mode 4 operating at a higher power setting than mode 2.

Although these modes of operation above have been described with reference to the supplementary source being provided in the compensation network arrangement for the secondary side, those skilled in the art will understand that similar modes are applicable to sources provided in the primary compensation network.

Although series-type AC side energy storage is ideal for alternative energy storage/sources such as super capacitors and fuel-cells, shunt-type AC side energy storage is preferred when integrating a higher voltage alternative energy source such as a generator, solar-cells or high voltage storage capacitors. In a shunt-type system the alternative energy sources are connected in parallel with the AC output of the power electronics converter. Novel circuit topologies and control techniques that can be used to integrate shunt-type AC side energy storage with an IPT system are proposed below. Three further application examples, one in relation to power factor correction, one in relation to dynamic charging, and the other in relation to a voltage boost to fully utilise properties of SiC switches are presented to illustrate the use of the shunt-type energy storage topologies.

Figure 16:
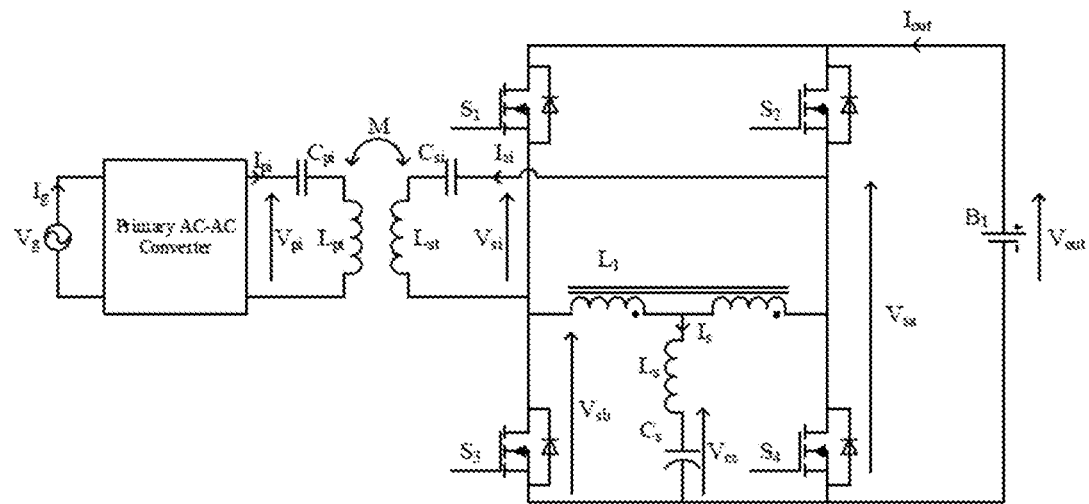
FIG. 16 is a circuit diagram of an IPT system which shows a shunt type AC side energy storage device.

FIG. 16 shows one of the proposed implementations of a shunt-type AC side energy storage where a high voltage capacitor bank ($C_s$) is used to achieve near zero power ripple while having a soft-DC bus on the primary side which is powered by the single-phase grid.

Figure 17:
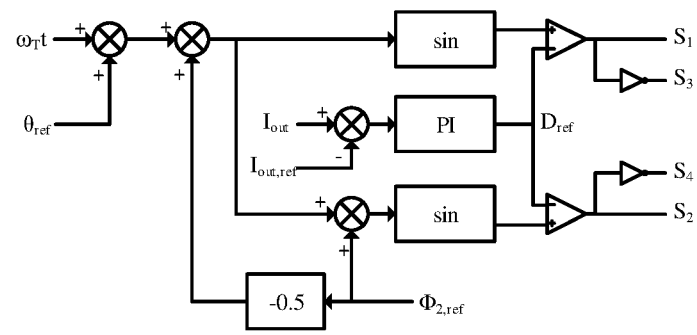
FIG. 17 shows a controller which may be used to control the secondary power converter referred to in FIG. 16.

A conventional BD-IPT system utilizes three power electronic converters, where the primary power supply consists of a high-frequency inverter, which is fed by the utility grid through a grid-tie inverter with PFC, to drive the primary side charging pad (magnetic coupler). The EV side power supply utilizes a passive/active rectifier, to facilitate power transfer between the primary supply and the EV battery. This architecture requires multiple power conversion stages, a large and expensive DC-link capacitor, and a large grid-side inductor, which increases the overall cost and size of the converter while negatively impacting on the reliability, due to limited capacitor life and efficiency. The proposed system eliminates the DC-link electrolytic capacitor, and instead utilises a high voltage capacitor bank (HVCB), $C_s$, as a shunt-type AC side energy buffer between the single-phase utility and a lithium-ion battery, $B_1$, on the EV side. This is done via the secondary full-bridge converter, composed of $S_{1-4}$. $S_2$ and $S_4$ are switched in a complementary manner, at the resonant frequency of the IPT network ($\omega_T$), to generate $V_{sa}$. Similarly $S_1$ and $S_3$ are used to generate $V_{sb}$. The phase difference between $V_{sa}$ and $V_{sb}$ ($\phi_2$), controls the magnitude of power transferred via the IPT network, while the duty cycle of $V_{sa}$ and $V_{sb}$ (D), controls the magnitude and direction of power transfer between the HVCB ($C_s$) and the lithium-ion battery ($B_1$). Equivalently, each bridge arm can be seen as a buck or boost converter, depending on the direction of power flow between the HVCB ($C_s$) and lithium-ion battery ($B_1$). Not only does this reduce the number of power processing stages required for grid integration, it also allows for a larger time varying voltage across the HVCB ($C_s$). This results in reducing the required capacitance. Furthermore, the novel use of a coupled inductor, L1, mitigates the issue of circulating currents, since the impedance seen by the differential component ($V_{si}$) is increased by a factor of 4. It also ensures the impedance seen by the common-mode component (DC-component) of $V_{sa}$ and $V_{sb}$ is close to zero. An example implementation of a novel controller that can be used to control the secondary power converter to achieve near zero power ripple is shown in FIG. 17.

Figure 18:
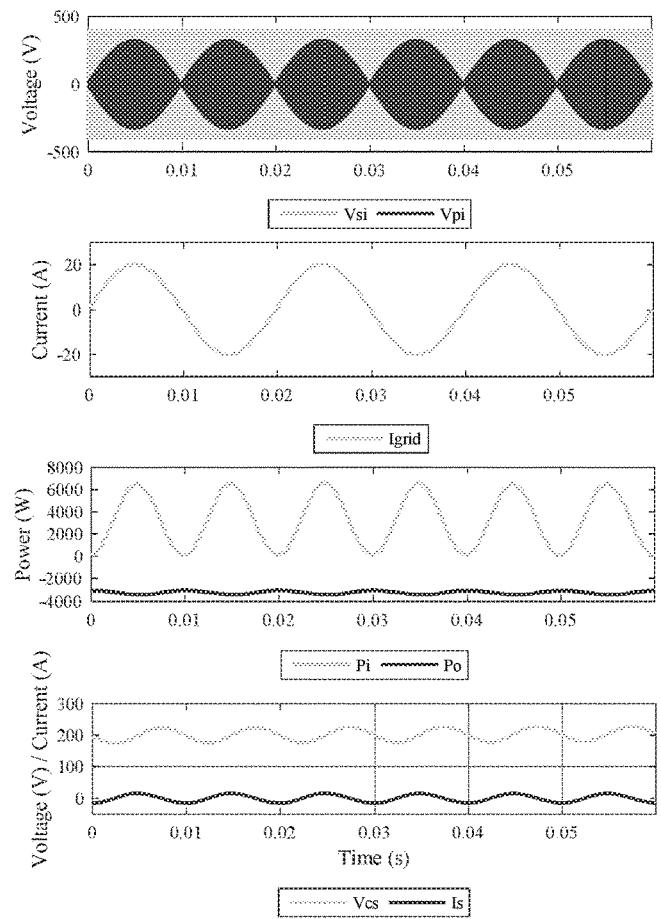
FIG. 18 shows simulated wave forms for the system of FIGS. 16 and 17.

In order to validate the proposed implementation, a 3 kW system was designed and simulated in MATLAB. The resulting waveforms are shown in FIG. 18—illustrating the ability of the system to effectively absorb the large 100 Hz power ripple present at the input (Pi) and produce a near zero output power ripple (Po).

Figure 19:
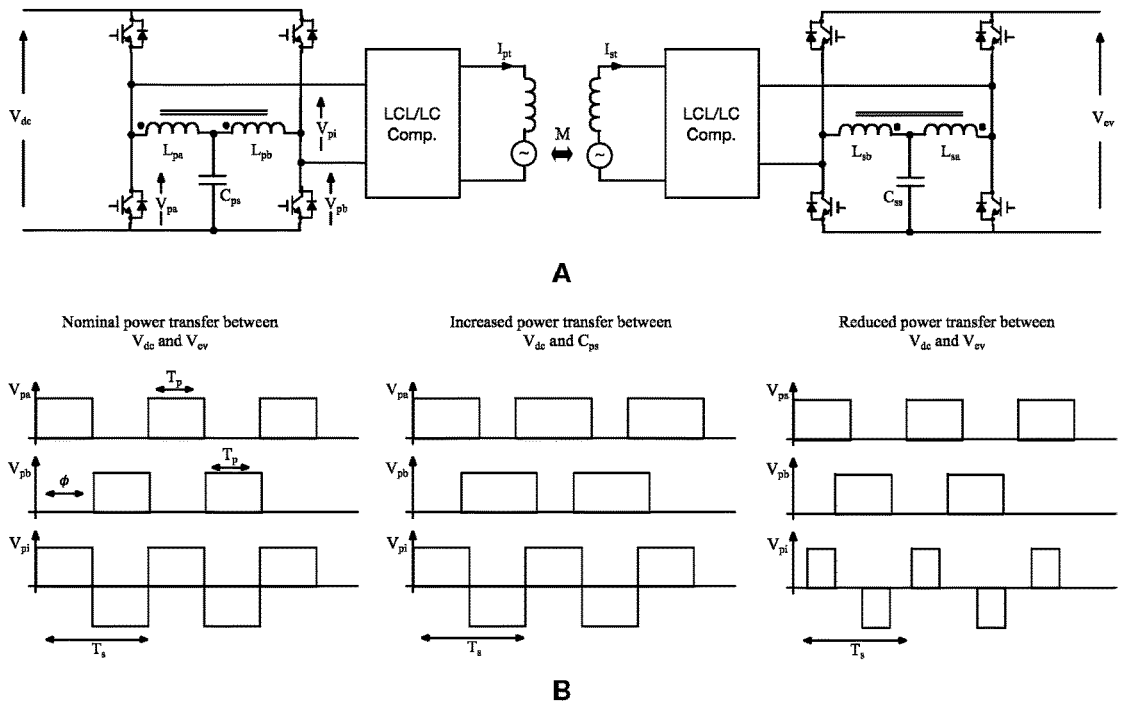
FIG. 19A shows another example of a shunt type AC side energy storage system.
FIG. 19B shows voltages generated by each half bridge on the primary side of the system for FIG. 19A.

FIG. 19A shows another example application where shunt-type AC side energy storage is used in both the primary and the secondary of a dynamic charging system. The capacitor Cps attached to the AC side of the primary power converter stores sufficient energy to be delivered to an EV when it travels over the primary coupler. The secondary side also employs a similar AC side storage system, which will absorb the pulse of energy produced by the primary converter and slowly release to the EV drive chain and the battery to avoid pulse charging of the battery. As described above, either or both of the AC side storage can be of shunt type if low voltage sources are used. However, a shunt type system has the advantages of a) the compensation network and coupler can be driven by a pure AC voltage, b) current flowing to/from AC side storage/source does not flow through the compensation circuit, c) lower current stresses on the switches leading to higher efficiency.

FIG. 19B illustrates the voltages generated by each half-bridge on the primary side as an example to show how the power transfer between each source can be controlled. For example, when both half-bridges of the primary converter are operated with 50% duty cycle (i.e. Tp=0.5×Ts) and complementary to each other (i.e. $\phi$=180°), the system is operated under nominal conditions and power is transferred through the IPT system between Vdc and Vev. The direction of this power flow can be changed as in the case of a typical bi-directional IPT system by operating the pick-up converter at a lagging or leading phase-angle. Under this mode of operation Cps will have charged to 50% of Vdc through Lpa and Lpb. To store more energy in Cps the duty-cycle of the two half-bridges are increased beyond 50% thus charging Cps to a higher voltage. Reverse process can be applied to discharge Cps transferring power in Cps to Vdc or Vev. The power transfer between Vdc and Vev remains at nominal level under this mode of operation. To reduce the magnitude of power transfer between Vdc and Vev, the phase-modulation $\phi$ can be reduced below 180°. Therefore, the pulse width of the voltages produced by the half-bridges, Tp, the phase-modulation applied between them, $\phi$, and the phase-angle between primary and secondary converter can be used to independently control the direction and magnitude of power transfer between Vdc, Cps, Css and Vev without having additional power converters as used conventionally to transfer power between four sources/loads.

Figure 20:
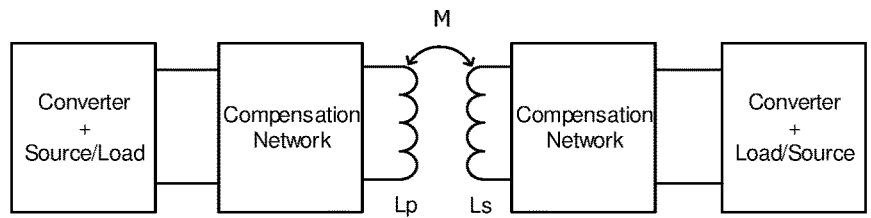
FIG. 20 shows the diagrammatic illustration of a bi-directional IPT system including a converter which has a source/load and compensation network in each side of the system.

Shunt-type AC side storage can also be used to produce a higher-voltage to drive the couples used in an IPT system, for example in an application requiring high-power transfer between primary and secondary. An example system is shown in FIG. 20, where two pads/coils/couplers, labelled Lp and Ls, are used to transfer power wirelessly to each side are driven by power converters through compensation networks. These pads are loosely or tightly coupled as determined by the value of mutual inductance, M—where for a typical IPT system M is in the order of 40% to about 1%. Each pad has its own compensation network which could either be same or different. Power is drawn from or given to a source/load using power converters on each side of pads. Here the source/load could either be a battery, fuel cell, capacitor, super capacitor or any of the common power source/load.

Figure 21:
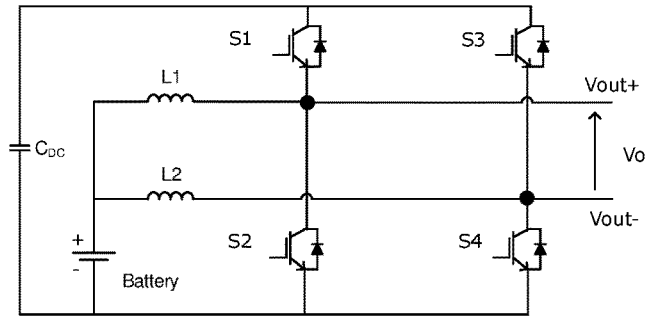
FIGS. 21 and 22 show different configurations for converters which may be used with the system of FIG. 20.
Figure 22:
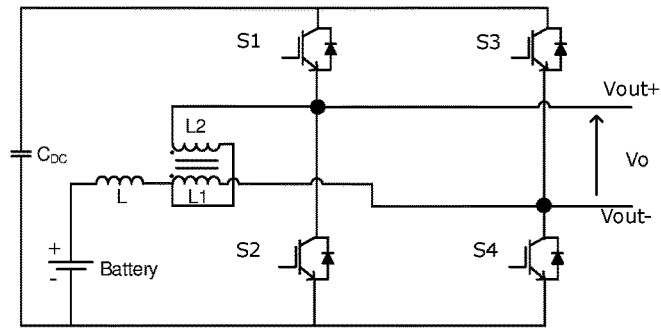

The converter on each side of the pads can be configured as shown in FIG. 21 or FIG. 22. Although, as an example, the source is represented by a battery, it can be replaced by the previously mentioned sources/loads as applicable. Although the converter shown in FIG. 21 can be used to achieve a simple implementation of this technique, which allows the DC-bus voltage supplying the power converter to be increased beyond the source voltage, the novel implementation shown in FIG. 22 will minimize the circulating currents in the system. The novel coupled inductor architecture used in FIG. 22, creates a large impedance to minimize the current flow between the two half-bridges while providing a low impedance path for the current flowing in/out of the source. The converter can be controlled to increase the voltage of the dc-link capacitor, $C_{DC}$, and, therefore, the maximum output voltage, Vo, of the power converter driving the primary/secondary coupler. The switches S1-S4 are controlled to produce an AC voltage Vo to drive the primary/secondary coupler through the compensation network, while also regulating the voltage of the dc-link, by transferring energy from/to the source/load to Cdc through the same switches. Under nominal operating conditions, the DC-link voltage will be twice the source/load voltage thus giving a 2-4 times boost in power transfer. Moreover, another advantage of this system is its ability to maintain a constant dc-link voltage at its nominal value even if the source voltage is decreasing/increasing.

Figure 23:
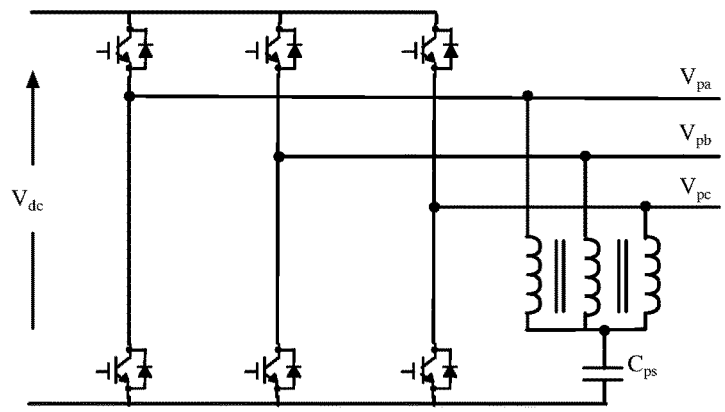
FIG. 23 shows an example of a circuit diagram for a 3 phase converter including a shunt type AC sides energy storage device.

The proposed AC side storage can also be applied to three/poly phase systems and FIG. 23 shows an example circuit diagram where shunt type AC-side storage is used. The three-phase output of the converter will be driving the primary or the pick-up coupler of an IPT system through a compensation network.

Apart from overcoming the problems mentioned in the background section of this document, the invention has many other advantages, including for example use of the supplementary source to be used for compensation such as power factor correction.

The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Any discussion of the prior art throughout the specification should in no way be considered as an admission that such prior art is widely known or forms part of common general knowledge in the field.

The invention claimed is:

1. An inductive power transfer (IPT) primary or secondary circuit for transferring energy to or from a magnetic flux coupler, the circuit comprising:
    a converter having a first side associated with a primary source and second side associated with a compensation network;
    the compensation network being configured to supply or receive energy to or from the magnetic flux coupler; and
    a supplementary source provided between the second side and the magnetic flux coupler,
    wherein the converter is operable to transfer energy between the primary source or another IPT primary or secondary circuit and the supplementary source,
    wherein the converter controls power transfer between the primary source and the supplementary source, and
    wherein at least one of:
        the converter transfers direct current to or from the supplementary source and simultaneously supplies alternating current to the compensation network for inductive power transfer; or
        the converter transfers direct current to or from the supplementary source and simultaneously rectifies alternating current from the compensation network.

2. The IPT primary or secondary circuit as claimed in claim 1, wherein the converter is also operable to energize the compensation network, or rectify current induced in the compensation network to facilitate transfer of energy to or from the other IPT secondary or primary circuit.

3. The IPT primary or secondary circuit as claimed in claim 1, wherein the primary source and/or the supplementary source can receive and supply energy.

4. The IPT primary or secondary circuit as claimed in claim 1, wherein the converter comprises a plurality of switches and the converter uses the switches of the converter to control the power transfer between the primary source and the supplementary source by controlling switches of the converter.

5. The IPT primary or secondary circuit as claimed in claim 4, wherein the switches of the converter are controlled by a controller to transfer energy to or from the supplementary source by transferring direct current to or from the supplementary source.

6. The IPT primary or secondary circuit as claimed in claim 1, wherein the converter transfers direct current to or from the supplementary source and simultaneously supplies alternating current to the compensation network for inductive power transfer.

7. The IPT primary or secondary circuit as claimed in claim 1, wherein the converter transfers direct current to or from the supplementary source and simultaneously rectifies alternating current from the compensation network.

8. The IPT primary or secondary circuit as claimed in claim 1, wherein the supplementary source is connected in series with the compensation network.

9. An IPT system comprising a primary IPT circuit and a secondary IPT circuit according to claim 1.

10. A method of controlling energy flow in a primary or secondary circuit of an IPT system, the method comprising:
    switching an alternating current to transfer power inductively;
    switching a direct current to or from a supplementary source provided between a converter and a magnetic flux coupler associated with the primary or secondary circuit,
    wherein the converter controls power transfer between a primary source and the supplementary source, and
    the method further comprises transferring, with the converter, direct current to or from the supplementary source and simultaneously rectifying alternating current from a compensation network.

11. The method as claimed in claim 10 wherein the switching is performed using the converter.

12. The IPT primary or secondary circuit as claimed in claim 1 wherein the supplementary source is connected to the compensation network.

13. The IPT primary or secondary source as claimed in claim 1 wherein the supplementary source is connected to the second side.

14. The IPT primary or secondary source as claimed in claim 1 wherein the supplementary source is connected to the magnetic flux coupler.

15. The IPT primary or secondary circuit as claimed in claim 4, wherein the switches of the converter are controlled by a controller to transfer energy to or from the supplementary source by transferring direct current to or from the supplementary source.

16. The IPT primary or secondary circuit as claimed in claim 5, wherein the switches are controlled to transfer direct current to or from the supplementary source and simultaneously supply alternating current to the compensation network for inductive power transfer.

17. The IPT primary or secondary circuit as claimed in claim 5, wherein the switches are controlled to transfer direct current to or from the supplementary source and simultaneously rectify alternating current from the compensation network.

18. The IPT primary or secondary circuit as claimed in claim 4, wherein the switches are controlled to transfer direct current to or from the supplementary source and simultaneously rectify alternating current from the compensation network.

19. A method of controlling energy flow in a primary or secondary circuit of an IPT system, the method comprising:
    switching an alternating current to transfer power inductively; and
    switching a direct current to or from a supplementary source provided between a converter and a magnetic flux coupler associated with the primary or secondary circuit,
    wherein the converter controls power transfer between a primary source and the supplementary source, and
    the method further comprises transferring, with the converter, direct current to or from the supplementary source and simultaneously supplying alternating current to a compensation network for inductive power transfer.

20. The method as claimed in claim 19 wherein the switching is performed using the converter.

* * * * *